US008050708B2

(12) United States Patent
March et al.

(10) Patent No.: US 8,050,708 B2
(45) Date of Patent: Nov. 1, 2011

(54) OPTION MANAGEMENT IN A SOFTWARE-DEFINED RADIO

(75) Inventors: David March, Rochester, NY (US); Tibor Dobri, Holley, NY (US); Mark Sanders, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 880 days.

(21) Appl. No.: 11/734,332

(22) Filed: Apr. 12, 2007

(65) Prior Publication Data

US 2008/0253434 A1    Oct. 16, 2008

(51) Int. Cl.
*H04M 1/00* (2006.01)
(52) U.S. Cl. .............. 455/552.1; 455/418; 455/419; 455/420; 455/553.1; 375/220
(58) Field of Classification Search .......... 455/418, 455/419, 420, 552.1, 553.1, 466, 556.2, 412, 455/13.4, 12.1, 41.3, 19
See application file for complete search history.

(56) References Cited

U.S. PATENT DOCUMENTS

| 6,937,877 | B2 | 8/2005 | Davenport ............... 455/552.1 |
| 7,043,023 | B2 * | 5/2006 | Watanabe et al. ............ 380/270 |
| 7,167,872 | B2 | 1/2007 | Linn et al. .................... 707/103 |
| 7,499,716 | B2 * | 3/2009 | Helferich ..................... 455/458 |
| 2002/0123336 | A1 * | 9/2002 | Kamada ........................ 455/420 |
| 2004/0242261 | A1 * | 12/2004 | Fette .......................... 455/550.1 |
| 2005/0009509 | A1 * | 1/2005 | Miscopein et al. ............ 455/418 |
| 2005/0213516 | A1 * | 9/2005 | Ramirez et al. .............. 370/254 |
| 2006/0003757 | A1 * | 1/2006 | Subramanian et al. ........ 455/418 |
| 2006/0046716 | A1 * | 3/2006 | Hofstaedter et al. ........ 455/432.2 |
| 2006/0130053 | A1 * | 6/2006 | Buljore et al. ................. 717/173 |
| 2006/0234691 | A1 | 10/2006 | Dygert .......................... 455/418 |
| 2008/0129497 | A1 * | 6/2008 | Woodard et al. .............. 340/540 |

FOREIGN PATENT DOCUMENTS

EP    1401224        3/2004
GB    2350749 A  *  6/1999

* cited by examiner

*Primary Examiner* — Edward Urban
*Assistant Examiner* — Ganiyu Hanidu
(74) *Attorney, Agent, or Firm* — Allen, Dyer, Doppelt, Milbrath & Gilchrist, P.A.

(57) ABSTRACT

The option management approach for SDRs includes control of installation and/or access to waveform features and/or platform features. A software-defined radio may include an antenna, a radio transceiver coupled to the antenna, and at least one memory storing a master feature database including a plurality of selectable waveform features and a plurality of selectable platform features, and a selected options database including selected waveform features and selected platform features from the master feature database. A controller cooperates with the at least one memory to configure the selected options database based upon an input options file and to permit reconfiguration of the selected options database based upon a subsequent input options file. The controller also cooperates with the radio transceiver and the selected options database to operate the SDR based upon the selected waveform features and the selected platform features.

27 Claims, 3 Drawing Sheets

| OPTIONS TEXT FILE | | | |
|---|---|---|---|
| Feature ID | SDR ID# | Enable | Range |
| 1 | ———————— | Y | . |
| 2 | ———————— | N | . |
| 3 | ———————— | N | . |
| . | . | . | 3-60 |
| . | . | . | . |
| . | . | . | . |
| . | . | . | . |
| N | ———————— | . | . |

OPTION MANAGEMENT IN A SOFTWARE-DEFINED RADIO

FIELD OF THE INVENTION

The present invention relates to the field of communications, and, more particularly, to wireless communications and related methods.

BACKGROUND OF THE INVENTION

Software Defined Radio (SDR) works much like desktop computing, where a single hardware platform can carry out many functions based on the software applications loaded. SDR uses software to perform radio-signal processing functions instead of using resistors, capacitors, feedback loops, or application-specific integrated circuits. Frequency tuning, filtering, synchronization, encoding and modulation are performed in software on high-speed reprogrammable devices such as digital signal processors (DSP), field programmable gate array (FPGA), or general purpose processors (GPP). RE components may still be needed for generation of high frequencies or for signal amplifications and radiation.

At the center of SDR technology is the software architecture on which the radios must be built and communication protocols implemented. Many proprietary architectures exist, but to ensure portability and interoperability of the protocols on the different radios, an open architecture was developed. The Software Communications Architecture (SCA) is a set of specifications describing the interaction between the different software and hardware components of a radio and providing software commands for their control. The SCA has been developed by the U.S. Department of Defense Joint Tactical Radio System (JTRS) project. The SCA is an open architecture framework that specifies how hardware and software components are to interoperate so that different manufacturers and developers can readily integrate the respective components into a single device.

So, SDRs can be typically implemented with relatively standard processor and hardware components. One particular class of software radio is the Joint Tactical Radio (JTR), which includes relatively standard radio and processing hardware along with any appropriate waveform software modules to implement the communication waveforms a radio will use. JTR radios also use operating system software that conforms with the SCA specification (see www.jtrs.saalt.mil), which is hereby incorporated by reference in its entirety.

The JTRS SCA defines a set of interfaces and protocols, often based on the Common Object Request Broker Architecture (CORBA), for implementing an SDR. In part, JTRS and its SCA are used with a family of software re-programmable radios. As such, the SCA is a specific set of rules, methods, and design criteria for implementing software re-programmable digital radios.

The JTRS SCA specification is published by the JTRS Joint Program Office (JPO). The JTRS SCA has been structured to provide for portability of applications software between different JTRS SCA implementations, leverage commercial standards to reduce development cost, reduce development time of new waveforms through the ability to reuse design modules, and build on evolving commercial frameworks and architectures.

The JTRS SCA is not a system specification, as it is intended to be implementation independent, but a set of rules that constrain the design of systems to achieve desired JTRS objectives. The software framework of the JTRS SCA defines the Operating Environment (OE) and specifies the services and interfaces that applications use from that environment. The SCA OE comprises a Core Framework (CF), a CORBA middleware, and an Operating System (OS) based on the Portable Operating System Interface (POSIX) with associated board support packages. The JTRS SCA also provides a building block structure (defined in the API Supplement) for defining application programming interfaces (APIs) between application software components.

The JTRS SCA Core Framework (CF) is an architectural concept defining the essential, "core" set of open software Interfaces and Profiles that provide for the deployment, management, interconnection, and intercommunication of software application components in embedded, distributed-computing communication systems. Interfaces may be defined in the JTRS SCA Specification. However, developers may implement some of them, some may be implemented by non-core applications (i.e., waveforms, etc.), and some may be implemented by hardware device providers.

The JTRS approach includes provisions to install/uninstall a waveform application to add or alter a feature set. However, the JTRS radio architecture has no provisions to control installation or access to features and/or waveforms. The current approach does not address modifications of a feature set within a waveform, control of waveform or features to specific customers or specific orders, and/or control of features requiring royalties.

SUMMARY OF THE INVENTION

In view of the foregoing background, it is therefore an object of the present invention to provide an option management approach for SDRs including control of installation and/or access to waveform features and/or platform features.

This and other objects, features, and advantages in accordance with the present invention are provided by a software-defined radio (SDR) including an antenna, a radio transceiver coupled to the antenna, and at least one memory storing a master feature database including a plurality of selectable waveform features and a plurality of selectable platform features, and a selected options database including selected waveform features and selected platform features from the master feature database. A controller cooperates with the memory to configure the selected options database based upon an input options file and to permit reconfiguration of the selected options database based upon a subsequent input options file. The controller also cooperates with the radio transceiver and the selected options database to operate the SDR based upon the selected waveform features and the selected platform features.

The memory may further store operating environment software, and wherein the controller may further cooperate with the memory to configure or reconfigure the selected options database without modification to the operating environment software. Also, the input options file may be an input options text file identifying each selectable waveform feature and each selectable platform feature with a value associated therewith. The respective value associated with each selectable waveform feature and each selectable platform feature may include a selected/deselected value and/or a numerical range value.

The controller may further implement an authorized sender authentication, an authorized recipient validation and/or a functional validation before permitting configuration or reconfiguration of the selected options database. The memory may also store at least one application program, and the controller may permit read-only access to the selected options database by the application program. The selectable platform features may comprise non-waveform related features and/or multi-waveform generic features.

A method aspect is directed to operating a software-defined radio (SDR) including a radio transceiver, at least one memory and a controller cooperating therewith. The method includes storing a master feature database including a plurality of selectable waveform features and a plurality of selectable platform features, and a selected options database including selected waveform features and selected platform features from the master feature database. The method also includes controlling the memory to configure the selected options database based upon an input options file and to permit reconfiguration of the selected options database based upon a subsequent input options file. The SDR is operated based upon the selected waveform features and the selected platform features by controlling the radio transceiver and the selected options database.

Operating environment software may be stored in the memory, and controlling the memory may include configuring or reconfiguring the selected options database without modification to the operating environment software. The input options file may comprise an input options text file, and the method may further include identifying each selectable waveform feature and each selectable platform feature with an associated value of the input options text file. The respective value associated with each selectable waveform feature and each selectable platform feature may include a selected/deselected value and/or a numerical range value.

Furthermore, controlling the memory may further include implementing an authorized sender authentication, an authorized recipient validation and/or a functional validation before permitting configuration or reconfiguration of the selected options database. The method may include storing an application program in the memory, and controlling the memory may include permitting read-only access to the selected options database by the at least one application program.

BRIEF DESCRIPTION OF THE DRAWINGS

FIG. 2 is an example of the options text file illustrated in FIG. 1.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As will be appreciated by those skilled in the art, portions of the present invention may be embodied as a method, data processing system, or computer program product. Accordingly, these portions of the present invention may take the form of an entirely hardware embodiment, an entirely software embodiment, or an embodiment combining software and hardware aspects. Furthermore, portions of the present invention may be a computer program product on a computer-usable storage medium having computer readable program code on the medium. Any suitable computer readable medium may be utilized including, but not limited to, static and dynamic storage devices, hard disks, optical storage devices, and magnetic storage devices.

The present invention is described below with reference to flowchart illustrations of methods, systems, and computer program products according to an embodiment of the invention. It will be understood that blocks of the illustrations, and combinations of blocks in the illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks, These computer program instructions may also be stored in a computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Figure 1:
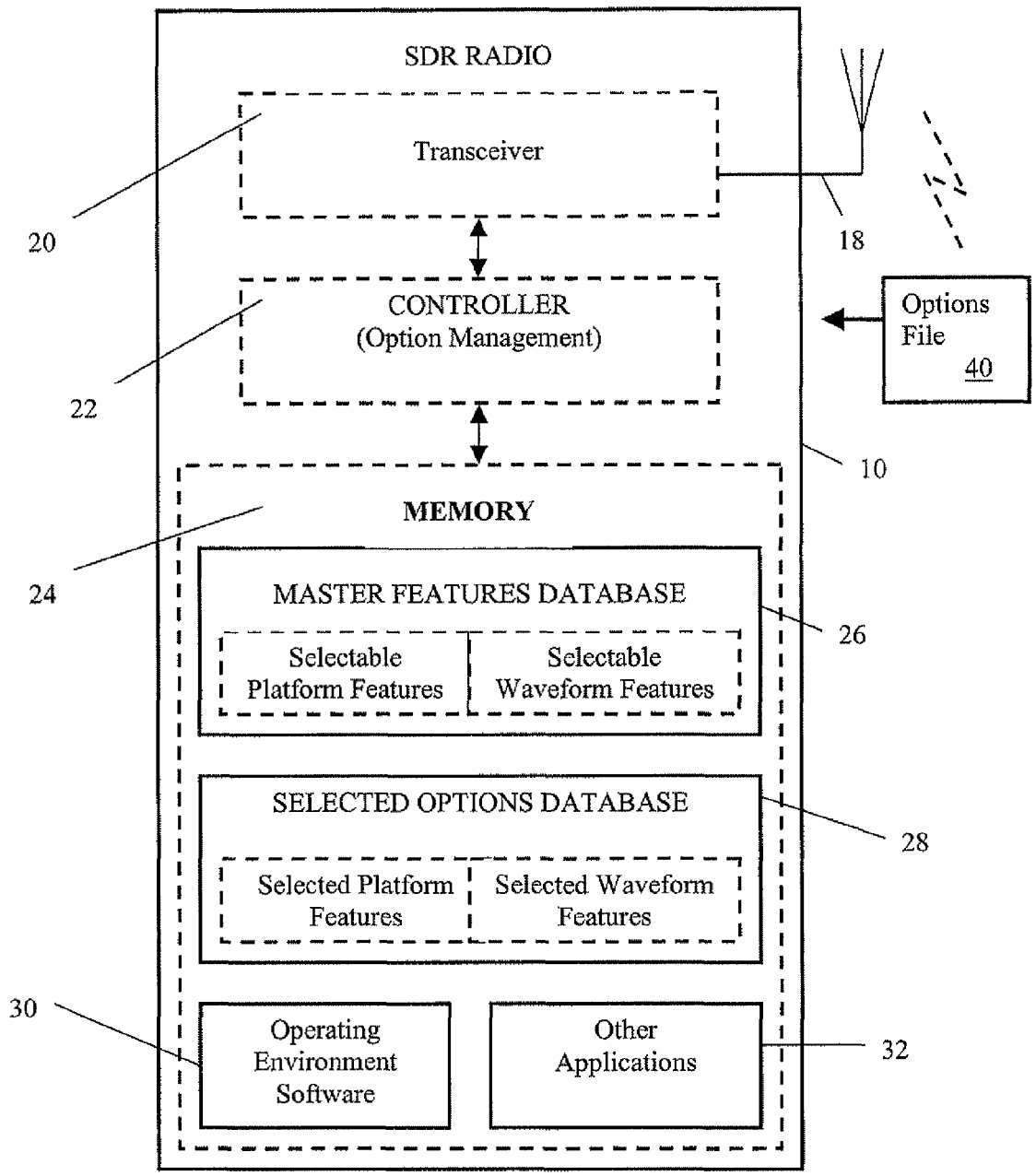
FIG. 1 is a schematic block diagram illustrating an embodiment of a software-defined radio (SDR) in accordance with features of the present invention.

Referring initially to FIG. 1, a software-defined radio (SDR) 10 in accordance with the present invention will now be described. An SDR may be thought of as a radio in which channel modulation waveforms are defined in software. That is, waveforms are generated as sampled digital signals, converted from digital to analog via a wideband Digital to Analog Converter (DAC) and then possibly upconverted from IF to RF. The receiver, similarly, employs a wideband Analog to Digital Converter (ADC) that captures all of the channels of the software radio. The receiver then extracts, downconverts and demodulates the channel waveform using software on a processor such as a digital signal processor (DSP), general purpose processor (GPP) or field programmable gate array (FPGA), for example.

As is appreciated by those skilled in the art, the Software Communications Architecture (SCA) is a set of specifications describing the interaction between the different software and hardware components of a radio and providing software commands for their control. The software framework of the SCA defines the Operating Environment (OE) and specifies the services and interfaces that applications use from that environment. The SCA OE may include a Core Framework (CF), a CORBA middleware, and an Operating System (OS) based on the Portable Operating System Interface (POSIX) with associated board support packages. The SCA also provides a building block structure for defining application programming interfaces (APIs) between application software components.

The SDR 10 includes an antenna 18, a radio transceiver 20 coupled to the antenna, and at least one memory 24. The memory 24 may be implemented by any suitable processor accessible memory capable of performing in accordance with the features of the present invention. As illustrated, the memory 24 stores a master feature database 26 including a plurality of selectable waveform features and a plurality of selectable platform features. A selected options database 28 includes selected waveform features and selected platform features from the master feature database. A controller 22 cooperates with the memory 24 to configure the selected options database 28 based upon an input options file 40 and to permit reconfiguration of the selected options database based upon a subsequent input options file. The controller 22 also cooperates with the radio transceiver 20 and the selected options database 28 to operate the SDR 10 based upon the selected waveform features and the selected platform features.

The options file 40 may be input to the SDR 10 wirelessly via antenna 18 or downloaded to the controller 22, e.g. to an input interface, via a portable software storage product such as a computer disc or flash memory, for example. Also, the input options file 40 may be an input options text file 40, as illustrated in FIG. 2, for example. The options text file 40 may include a feature identification and/or an SDR identification, and may identify each selectable waveform feature and each selectable platform feature with a value associated therewith. The respective value associated with each selectable waveform feature and each selectable platform feature may include a selected/deselected value (e.g. enable or disable) and/or a numerical range value.

The memory 24 may further store operating environment software 30, and the controller 22 preferably cooperates with the memory to configure or reconfigure the selected options database 28 without modification to the operating environment software 30. The memory 24 may also store at least one application program 32, and the controller 22 may permit read-only access to the selected options database 28 by the application program 32.

The controller 22 may further implement an authorized sender authentication of the options file 40 to verify that the options are being authorized by a valid sender before permitting configuration or reconfiguration of the selected options database 28. When an options file 40 is input to the SDR 10, the platform applications may validate the options file 40 signature (e.g. digital signature standard DSS) before installing.

The controller 22 may implement an authorized recipient validation of the options file 40 to verify that the options are valid and intended for the respective SDR 10 before permitting configuration or reconfiguration of the selected options database 28. The controller 22 may implement a functional validation of the options file 40 to determine possible inconsistencies between optional features and installed features before permitting configuration or reconfiguration of the selected options database 28. The selectable platform features may comprise non-waveform related features and/or multi-waveform generic features such as, for example, SDR positioning features or an audio codec.

Figure 3:
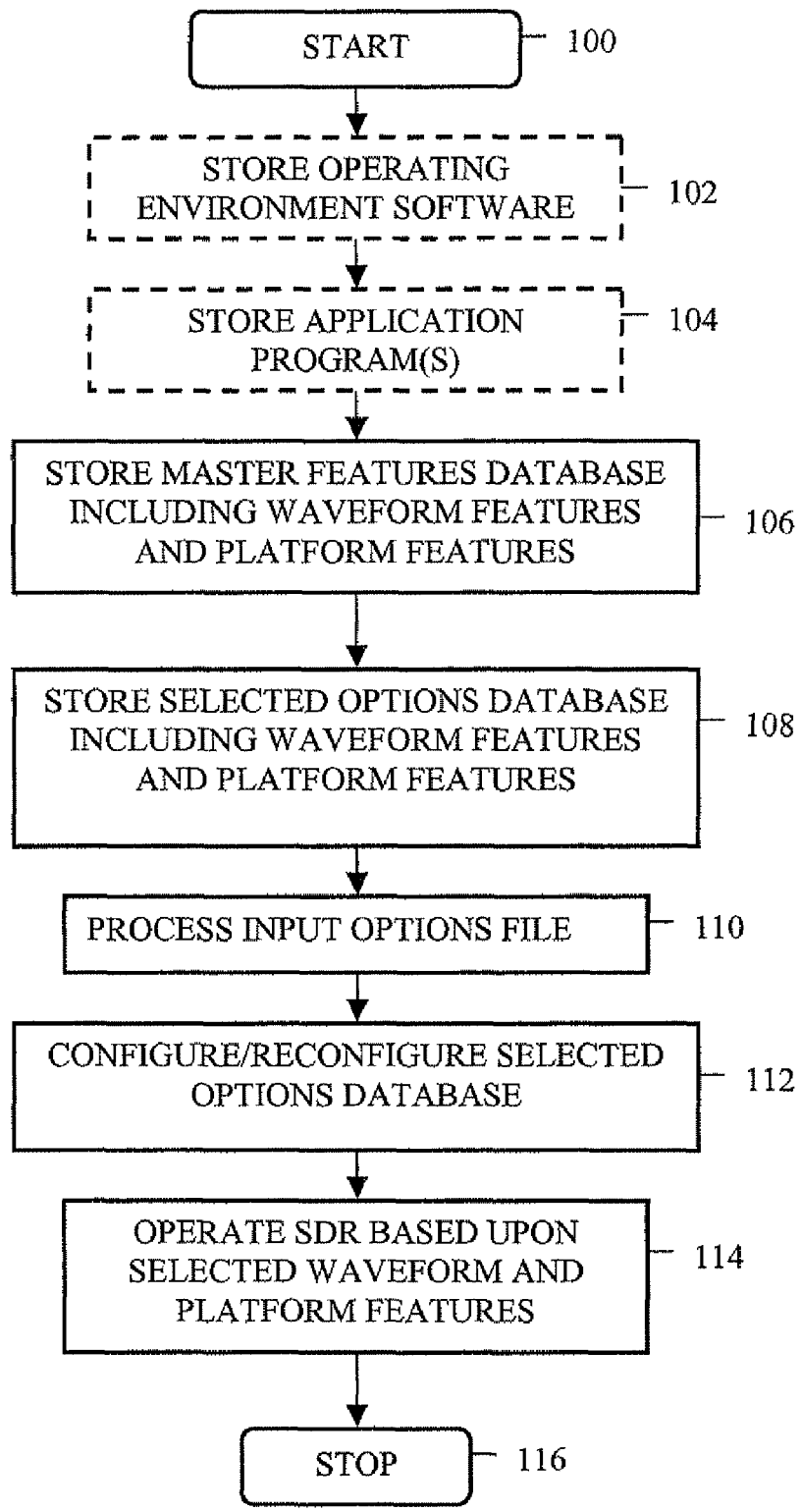
FIG. 3 is a flowchart illustrating various steps of an embodiment of a method for operating an SDR in accordance with features of the present invention.

A method aspect will be described with reference to the flowchart of FIG. 3. The method is directed to operating a software-defined radio (SDR) 10 including a radio transceiver 20, at least one memory 24 and a controller 22 cooperating therewith. The method begins at block 100 and includes storing a master feature database 26 including a plurality of selectable waveform features and a plurality of selectable platform features (block 106). A selected options database 28 including selected waveform features and selected platform features from the master feature database is stored at block 108. The method also includes controlling the at least one memory 24 to configure the selected options database 28 (block 112) based upon an input options file (processed at block 110) and to permit reconfiguration of the selected options database 28 based upon a subsequent input options file. At block 114, the SDR 10 is operated based upon the selected waveform features and the selected platform features by controlling the radio transceiver 20 and the selected options database 28, before ending at block 116.

Operating environment software 30 may be stored in the memory 24 (at block 102), and controlling the memory preferably includes configuring or reconfiguring the selected options database 28 without modification to the operating environment software 30. The method may include storing an application program 32 in the memory 24 (block 104), and controlling the memory may include permitting read-only access to the selected options database 28 by the at least one application program 32. Furthermore, controlling the memory 24 may further include implementing an authorized sender authentication, an authorized recipient validation and/or a functional validation before permitting configuration or reconfiguration of the selected options database, as discussed above.

The approach of the present invention provides option enabling for both waveforms and/or platform features. The approach is a scalable-generic format that allows future information to be added/displayed without the need to modify the operating environment code upon option addition/modification. The approach includes the ability to target a customer radio pool via an identifier such as the radio serial number. This would be done by providing a radio serial number effectivity. For example, an option file 40 could be applicable to a range of serial numbers, all serial numbers or a series of serial numbers.

As discussed, the approach provides authentication of the options file 40. For example, the options file would have the same level of security as the OE or waveform code. This may be done by DSS signing the options file and installing it. Waveform defined options allows waveform unique option data structures without the need to modify operating environment code.

For example, a PC application may create an option file 40 which is signed by the manufacturer in the same manner as the radio software is signed. The option file contains option name and a value (enabled/disabled). Option file 40 may also contain additional items such as: serial number set, applicable sales order number(s), waveform specific configuration data such as frequency range, hopset width, special customer configuration etc.

The installed options may be stored in a persistent SQL database that is unaffected by zeroization or software install. Platform software and installed applications access the options database via a generic API layer. A unique option ID may be used as a database key to form a SQL query and return information about the requested option. Integrity of the database is ensured by the platform software and this may include managing additions and removals to/from the database, To prevent installed applications from corrupting the options database, their access is preferably read-only. A DSS signed file with a key controlled by the manufacturer installs like any other software package, and the option file 40 may be targeted towards a specific radio serial number or sales order.

The approach includes the ability to add options without prior knowledge of the target radio configuration. The waveform installation package can indicate the option is required to authorize proper installation, and waveform options may be installed and accessed in a generic way. Importantly, the operating environment does not require software modifications to add new options in accordance with the approach of the present invention.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A software-defined radio (SDR) comprising:
    an antenna;
    a radio transceiver coupled to said antenna;
    at least one memory storing
        a master feature database including a plurality of selectable waveform features and a plurality of selectable platform features, and
        a selected options database including selected waveform features and selected platform features from said master feature database; and
    a controller cooperating with said at least one memory to configure the selected options database based upon an input options file and to permit reconfiguration of the selected options database based upon a subsequent input options file;
    said controller also cooperating with said radio transceiver and said selected options database to operate the SDR based upon the selected waveform features and the selected platform features.

2. The SDR according to claim 1, wherein said at least one memory further stores operating environment software; and wherein said controller further cooperates with said at least one memory to configure or reconfigure the selected options database without modification to the operating environment software.

3. The SDR according to claim 1, wherein the input options file comprises an input options text file identifying each selectable waveform feature and each selectable platform feature with a value associated therewith.

4. The SDR according to claim 3, wherein the respective value associated with each selectable waveform feature and each selectable platform feature comprises a selected/deselected value.

5. The SDR according to claim 3, wherein the respective value associated with each selectable waveform feature and each selectable platform feature comprises a numerical range value.

6. The SDR according to claim 1, wherein said controller further implements an authorized sender authentication before permitting configuration or reconfiguration of the selected options database.

7. The SDR according to claim 1, wherein said controller further implements an authorized recipient validation before permitting configuration or reconfiguration of the selected options database.

8. The SDR according to claim 1, wherein said controller further implements a functional validation before permitting configuration or reconfiguration of the selected options database.

9. The SDR according to claim 1, wherein said at least one memory further stores at least one application program; and wherein said controller permits read-only access to the selected options database by the at least one application program.

10. The SDR according to claim 1, wherein the selectable platform features comprise at least one of non-waveform related features and multi-waveform generic features.

11. A software-defined radio (SDR) comprising:
    an antenna;
    a radio transceiver coupled to said antenna;
    at least one memory storing
        operating environment software,
        a master feature database including at least one of a plurality of selectable waveform features and a plurality of selectable platform features, and
        a selected options database including at least one of selected waveform features and selected platform features from said master feature database; and
    a controller cooperating with said at least one memory to configure the selected options database based upon an input options text file and to permit reconfiguration of the selected options database based upon a subsequent input options file without modification to the operating environment software;
    said controller also cooperating with said radio transceiver and said selected options database to operate the SDR based upon the operating environment software, selected waveform features and selected platform features.

12. The SDR according to claim 11, wherein the input options text file identifies each selectable waveform feature and each selectable platform feature with a value associated therewith.

13. The SDR according to claim 11, wherein said controller further implements at least one of an authorized sender authentication, an authorized recipient validation and a functional validation before permitting configuration or reconfiguration of the selected options database.

14. The SDR according to claim 11, wherein said at least one memory further stores at least one application program; and wherein said controller permits read-only access to the selected options database by the at least one application program.

15. A method of operating a software-defined radio (SDR) including a radio transceiver, at least one memory and a controller cooperating therewith, the method comprising:
    storing in the at least one memory
        a master feature database including a plurality of selectable waveform features and a plurality of selectable platform features, and
        a selected options database including selected waveform features and selected platform features from the master feature database;
    controlling the at least one memory to configure the selected options database based upon an input options file and to permit reconfiguration of the selected options database based upon a subsequent input options file; and
    operating the SDR based upon the selected waveform features and the selected platform features by controlling the radio transceiver and the selected options database.

16. The method according to claim 15, further comprising storing operating environment software in the at least one memory; and wherein controlling the at least one memory includes configuring or reconfiguring the selected. options database without modification to the operating environment software.

17. The method according to claim 15, wherein the input options file comprises an input options text file; and further comprising identifying each selectable waveform feature and each selectable platform feature with an associated value of the input options text file.

18. The method according to claim 17, wherein the respective value associated with each selectable waveform feature and each selectable platform feature comprises a selected/deselected value.

19. The method according to claim 17, wherein the respective value associated with each selectable waveform feature and each selectable platform feature comprises a numerical range value.

20. The method according to claim 15, wherein controlling the at least one memory further includes implementing an authorized sender authentication before permitting configuration or reconfiguration of the selected options database.

21. The method according to claim 15, wherein controlling the at least one memory further includes implementing an authorized recipient validation before permitting configuration or reconfiguration of the selected options database.

22. The method according to claim 15, wherein controlling the at least one memory further includes implementing a functional validation before permitting configuration or reconfiguration of the selected options database.

23. The method according to claim 15, further comprising storing at least one application program in the at least one memory; and wherein controlling the at least one memory includes permitting read-only access to the selected options database by the at least one application program.

24. A method of operating a software-defined radio (SDR) including a radio transceiver, at least one memory and a controller cooperating therewith, the method comprising:
storing in the at least one memory
operating environment software,
a master feature database including at least one of a plurality of selectable waveform features and a plurality of selectable platform features, and
a selected options database including at least one of selected waveform features and selected platform features from the master feature database;
controlling the at least one memory to configure the selected options database based upon an input options text file and to permit reconfiguration of the selected options database based upon a subsequent input options file without modification to the operating environment software; and
operating the SDR based upon the operating environment software, selected waveform features and selected platform features by controlling the radio transceiver and the selected options database.

25. The method according to claim 24, further comprising identifying each selectable waveform feature and each selectable platform feature with an associated value of the input options text file.

26. The method according to claim 24, wherein controlling the at least one memory further comprises implementing at least one of an authorized sender authentication, an authorized recipient validation and a functional validation before permitting configuration or reconfiguration of the selected options database.

27. The method according to claim 24, further comprising storing at least one application program in the at least one memory; and wherein controlling the at least one memory includes permitting read-only access to the selected options database by the at least one application program.

* * * * *